US 6,665,756 B2

(12) United States Patent
Abramson et al.

(10) Patent No.: US 6,665,756 B2
(45) Date of Patent: Dec. 16, 2003

(54) BUS INTERFACE UNIT FOR REFLECTING STATE INFORMATION FOR A TRANSFER REQUEST TO A REQUESTING DEVICE

(75) Inventors: Darren L. Abramson, Folsom, CA (US); Mikal C. Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/328,673

(22) Filed: Dec. 23, 2002

(65) Prior Publication Data

US 2003/0131164 A1 Jul. 10, 2003

Related U.S. Application Data

(62) Division of application No. 09/475,964, filed on Dec. 30, 1999, now Pat. No. 6,499,077.

(51) Int. Cl.[7] .......................... G06F 13/00; G06F 13/14; G06F 13/28; G06F 13/38
(52) U.S. Cl. .............................. 710/107; 710/5; 710/7; 710/15; 710/19; 710/20; 710/29; 710/39; 710/52; 710/104; 710/112; 710/126
(58) Field of Search .................................. 710/1, 2, 5–7, 710/15–20, 22, 29, 33, 36, 39, 52, 53, 56, 62–64, 101, 104, 107, 112, 126, 129, 130

(56) References Cited

U.S. PATENT DOCUMENTS

| | | |
|---|---|---|
| 4,480,307 A | 10/1984 | Budde et al. |
| 5,438,665 A | 8/1995 | Taniai et al. |
| 5,448,702 A | 9/1995 | Garcia et al. |
| 5,513,320 A | 4/1996 | Young et al. |
| 5,606,665 A | 2/1997 | Yang et al. |
| 5,644,784 A | 7/1997 | Peek |
| 5,717,952 A | 2/1998 | Christiansen et al. |
| 5,809,334 A | 9/1998 | Galdun et al. |
| 5,832,308 A * | 11/1998 | Nakamura et al. ............ 710/53 |
| 5,870,627 A | 2/1999 | O'Toole et al. |
| 5,881,256 A | 3/1999 | Lee |
| 5,949,980 A * | 9/1999 | Lee et al. ..................... 710/112 |
| 5,961,614 A * | 10/1999 | Christiansen ................ 710/22 |
| 6,012,116 A * | 1/2000 | Aybay et al. ................ 710/113 |
| 6,047,001 A | 4/2000 | Kuo et al. |
| 6,070,194 A | 5/2000 | Yu et al. |
| 6,154,796 A * | 11/2000 | Kuo et al. ..................... 710/52 |
| 6,161,160 A | 12/2000 | Niu et al. |
| 6,199,124 B1 | 3/2001 | Ramakrishnan et al. |
| 6,205,494 B1 | 3/2001 | Williams |
| 6,237,066 B1 | 5/2001 | Pan et al. |
| 6,324,597 B2 | 5/2001 | Collier |
| 6,321,302 B1 * | 11/2001 | Strongin et al. ............. 711/138 |
| 6,324,595 B1 * | 11/2001 | Tsai et al. .................... 710/15 |
| 6,334,162 B1 | 12/2001 | Garrett et al. |
| 6,341,322 B1 * | 1/2002 | Liu et al. ...................... 714/38 |
| 6,446,143 B1 * | 9/2002 | Razdan et al. ............... 710/29 |

* cited by examiner

Primary Examiner—Jeffrey Gaffin
Assistant Examiner—Tanh Q Nguyen
(74) Attorney, Agent, or Firm—Blakely, Sokoloff, Taylor & Zafman LLP

(57) ABSTRACT

A request interface device and method for operating the device and its components are described. The request interface device comprises a bus interface unit (BIU) and a requesting device. The requesting device generates a transfer request for data or command information, along with state information determining the manner in which the requestor will transfer the data or command information associated with the request once the transfer request is granted. The transfer request and the associated state information are sent to the BIU, freeing the requestor to generate new requests wile the first transfer request is waiting to be granted. The transfer request and associated information is stored in a queue within the BIU while the BIU logic gains access to the host bus. Once the transfer request is granted, it is sent over the host bus to its target while the associated state information is concurrently reflected back to the requestor to be used by the requestor to complete the data or command information transfer.

20 Claims, 5 Drawing Sheets

BUS INTERFACE UNIT FOR REFLECTING STATE INFORMATION FOR A TRANSFER REQUEST TO A REQUESTING DEVICE

The present application is a divisional application of U.S. patent application Ser. No. 09/475,964, filed Dec. 30, 1999, entitled "Bus Interface Unit For Reflecting State Information For a Transfer Request to a Requesting Device", now U.S. Pat. No. 6,499,077. The U.S. patent application Ser. No. 09/475,964 is hereby entirely incorporated by reference.

FIELD OF THE INVENTION

The invention relates generally to information transfer over a computer bus. More specifically, the invention relates to a bus interface unit (BIU) connected with a requestor, wherein state information determining how the requestor will act on a particular transfer request is passed to the BIU which reflects the state information back to the requestor once access to the host bus is granted.

BACKGROUND OF THE INVENTION

A bus is a path over which data and commands are transmitted between components of a computer system. Each bus is characterized by the width of the data transfer path, the speed at which data may move along the path, and the protocol by which the data is transferred over the bus. There are a number of different types of busses within a typical computer system. For instance, a typical personal computer system has a processor bus which transfers information to and from the processor and the chipset, a cache bus which transfers data between a cache and the processor, a memory bus which transfers that transfers information between the chipset and the memory, a host (or local) bus (such as PCI) which is used to connect high speed peripherals to the chipset, and one or more I/O busses (such as an ISA bus, a SCSI bus, a IEEE 1394 bus or USB) connected to the host bus and used to connect certain types of peripherals to the computer system.

Each bus typically comprises one or more information transfer paths. For example, one path may be provided to transfer data and another may be provided to pass control information, such as address information about where in memory data is to be read from or written to. Additionally, each type of bus typically has a bus controller that controls the transfer of data and information over the bus between the components connected to it.

Where two different buses interface, an interface device, such as a bridge, is required to translate between the different protocols utilized by each bus to move information and data to facilitate the efficient transfer of information through the interface device.

For example, a typical personal computer has a PCI local bus to which certain performance critical devices are attached, such as video cards and storage devices. Additionally, a personal computer system typically has a ISA and/or USB bus connected to the PCI bus that is used for slower, less performance critical devices, such as mice, keyboards, and modems. In order to send data received from an Internet connection by a modem to a video card and subsequently a monitor for display, it is necessary to transfer the data over an interface device between the ISA and PCI buses. The interface device needs to be configured specific to the requirements of the PCI bus and be able to communicate with the PCI bus, while the interface device also needs to be configured to receive data and information from the ISA bus. Essentially, the interface device is designed specifically for the two buses it bridges.

A "request interface device" is one type of interface device in which commands or data may be transferred over a host bus such as a PCI bus to and from a peripheral to another component of the computer system without the involvement of the computer system's central processing unit (CPU). A typical request interface device is comprised of a bus interface unit (BIU) that communicates with a host bus for access to the host bus to transfer data and commands, and a requestor that generates requests for data and commands on behalf of a device or peripheral attached to another bus such as an I/O bus. An example of a requestor would be a DMA engine that can read and write to memory without the involvement of the CPU.

For example, an interface device might include a DMA engine in communication with a printer connected to Universal serial bus (USB) that has been commanded by the CPU to print some pages of a document. The DMA engine might be directed to retrieve data stored in memory that represents the document being printed. Therefore, the DMA engine generates a request for the specific data and sends that request to the memory to retrieve the required data, however, in order transmit the request the DMA must get access to the PCI bus with which the memory is connected, typically, by way of a memory bus and a chipset. The BIU performs the function of gaining access to the PCI bus by communicating with the PCI bus controller and when permitted to do so mastering the PCI bus. The BIU then transmits the DMA's request to the memory, whereby the requested data is retrieved from the memory and transported to the DMA and eventually the printer.

SUMMARY OF THE INVENTION

A bus interface unit (BIU) and a method for operating the BIU are described wherein the BIU operates on transfer requests generated by a requestor for transmittal over a host bus of a computer system. The BIU has one interface with a requestor through which it receives a request to transfer information over the host bus from the requestor along with state information associated with the request. The BIU also has another interface with the host bus, memory for storing both the transfer request and its associated state information, and BIU logic.

The BIU logic gains access to the host bus to facilitate the transfer of the transfer request over the host bus. Next, it retrieves the transfer request and the associated state information from memory. The transfer request is transmitted over the host bus to a target while the state information is contemporaneously reflected back through the interface in which the BIU is connected with the requestor.

BRIEF DESCRIPTION OF THE DRAWINGS

The appended claims set forth the features of the invention with particularity. The invention is illustrated by way of example, and not by way of limitation, from the following detailed description taken in conjunction with the accompanying drawings of which:

DETAILED DESCRIPTION OF THE PREFFERED EMBODIMENT

Figure 1:
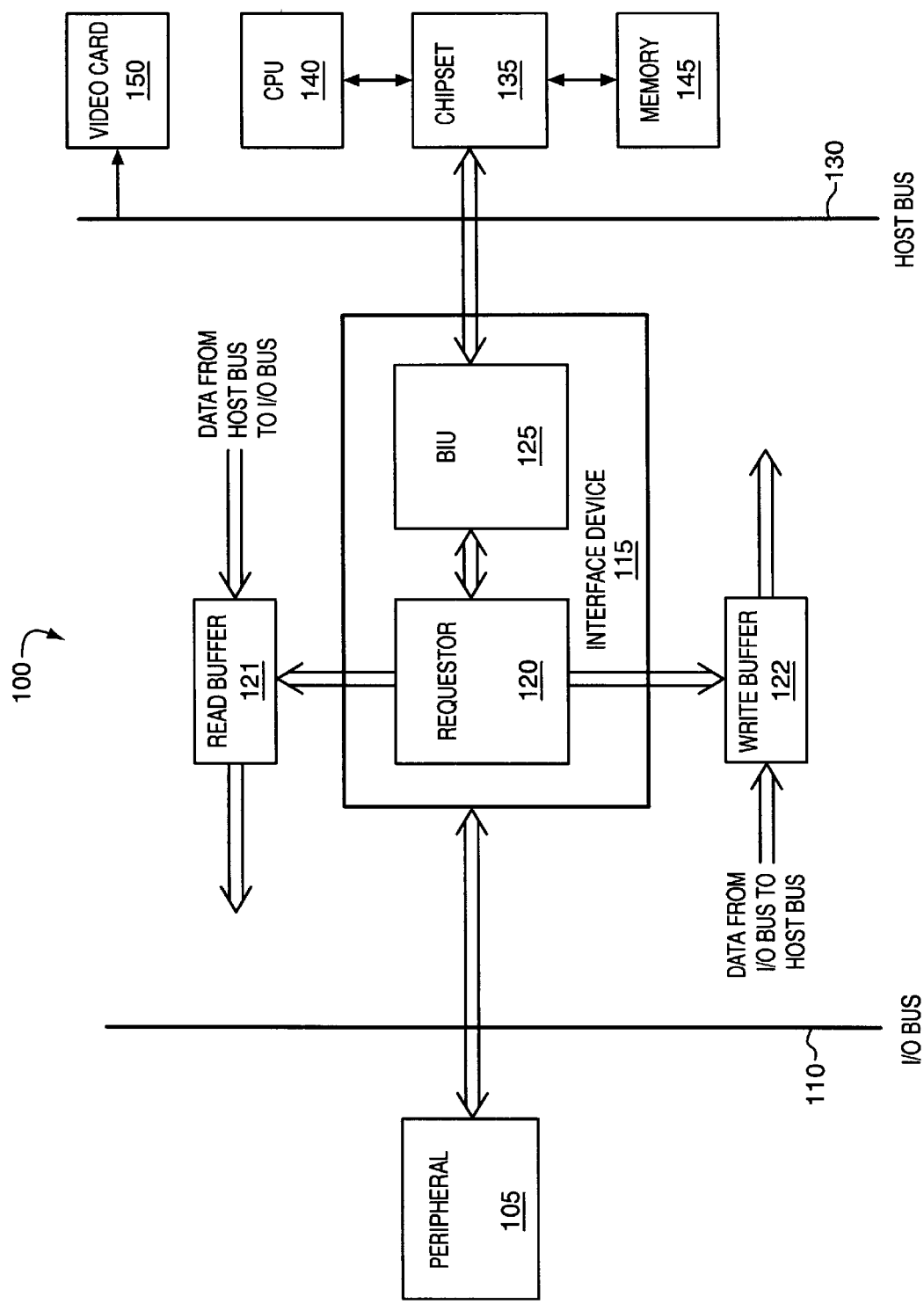
FIG. 1 is a block diagram illustrating the operating environment of a request interface device.

An interface device for facilitating communication between devices on an I/O bus and a host bus and a method of operating the interface device are disclosed. The disclosed interface device comprises a bus interface unit (BIU) designed to interface with a specific host bus, and a generic requestor device that is connected with an I/O bus and the BIU. The requestor can issue commands and read/write data through the host bus without processor involvement by way of the BIU to obtain information or data required by I/O bus peripherals to which the requestor is in connection with.

In embodiments of the invention, state information may be used by the requestor to direct information, such as commands and data, between the I/O peripheral and a target component connected with the host bus. State information associated with a particular request is sent to the BIU along with the request and is stored in the BIU to be subsequently reflected back to the requestor when the request is granted. Advantageously, this permits the use of a requestor that does not have to maintain its state for a particular request until the request is completed nor does the requestor have to store state information associated with a request for use when the request is completed.

In a preferred embodiment, a request interface device includes a BIU designed to facilitate efficient information transfer with a particular host bus and need only maintain a generic handshake with a requestor that is optimized for a particular I/O bus. The BIU maintains a pipeline queue having a depth that is dependent upon the characteristics of the host bus. Because the state information used by the requestor to perform certain commands or transfer certain data is maintained in the BIU, the requestor need not store the information in a queue of its own and therefore the requestor can be designed independently of a particular type of host bus to which it might be coupled. In this manner, the generic requestor design can be reused with BIU interfaces for different host busses without modification or redesign. In contrast, a requestor that must store state information for a pipelined requests must be designed to be consistent with the BIU's pipeline depth.

In another embodiment, the use of state information transferred to the BIU and reflected back permits the connection of multiple requestors to a single BIU. For example, the state information may be reflected back to a mux/demux device that routes the remaining state information, as applicable, and a request grant indication to the proper requester.

The invention is not limited to a single computing environment. Moreover, the architecture and functionality of the invention as taught herein and as would be understood by one skilled in the art is extensible to other types of computing environments and embodiments in keeping with the scope and spirit of the invention. The invention provides for various apparatus and methods. With this in mind, the embodiments discussed herein should not be taken as limiting the scope of the invention; rather, the invention contemplates all embodiments as may come within the scope of the appended claims.

Terminology

BIU—A bus interface unit (BIU) generally refers to a device that facilitates the movement of requests, commands and/or information between a device capable of issuing requests and commands, such as a requestor or a processor, and a computer bus. Its primary function is to interface with the bus controller to gain access to the bus over which the requests, commands and data are transferred.

Host Bus—Any bus over which information requests are sent by a BIU.

I/O Bus—A bus to which input and output peripherals are generally connected, over which commands and data are transmitted to and from the input and output peripherals.

Pipelining—a method whereby a device (such as a processor or a requester) is able to accept a new instruction prior to competition of a prior instruction. For example, a pipelined DMA requestor is able to receive one or more read or write requests from a peripheral, although it has not completed processing an earlier first read or write request. This is contrasted with a DMA requestor that is not pipeline compatible that can only work on a single request. Once a first request is accepted the non-pipelined DMA requestor will not accept a new request until it has sourced or sunk the data associated with the first request.

Queue—A memory structure from which items are removed from the queue in the same order in which they were entered i.e. a FIFO (first in first out). In the context of a request interface device with a BIU, if three requests are received and queued by the BIU, the first to be granted will be the request that was first received by the BIU.

Request Information—Information and commands necessary to execute a request generated by a requestor. For instance, request information from a DMA requestor to read data from memory might include the memory address from which the data will be read.

Request Interface Device—a device that can generally generate requests to transfer information such as data and/or command sets and negotiate with a host bus for access to the bus, and once access is gained, transfer the information over the host bus.

Requestor—a device that can access memory to read or write data and/or transfer command information between peripherals and components of a computer system without the intervention or assistance of the central processing unit.

State Information—Information that determines how a requestor will function relative to data or commands related to a particular request.

A Request Interface Device

FIG. 1 is a block diagram illustrating the operating environment of a request interface device 115. When a peripheral device 105 requires data from memory 145, the need is communicated to a requestor 120 of a request interface device 115. The requestor's function is to retrieve data from memory so that the peripheral 105 can use it as necessary. For example, a printer might need a block of data that comprises a document that it is printing. However, before the requestor 120 can retrieve the data, it must request and be granted access to the host bus 130 through which the data will pass. Therefore, the requestor 120 generates a request for access to the host bus 130 and access to a specific location in memory 145 from which it will read the data and sends it to a bus interface unit (BIU) 125. It is the function of the BIU 125 to negotiate access to the host bus 130 and transfer the request information to the memory 145. Once access has been granted, the request information is sent to memory 145 and the data is transferred over the host bus 130 from memory 145 into the read buffer 121 and an indication that the request has been granted is sent to the requestor 120 from the BIU 125. Finally, the requester 120 transfers the data from the read buffer 121 to the peripheral 105 over I/O bus 110.

The opposite process may also occur, where the peripheral 105 needs to have data it has acquired or generated written to a location in memory 145. In this case, the process is essentially the same except that the data is sent to the write buffer 122 by the peripheral 105 to be transferred to memory once the request for access to the host bus 130 is granted by the BIU 125.

Although it is common for the requestor 120 to be a Direct Memory Access (DMA) engine that can read and write data to and from memory 145 without processor interaction, the requestor 120 is not limited to operation as such. For instance, the requestor 120 could request a command set to control the operation of the peripheral 105 connected to the I/O bus 110.

The description thus far presumes that the interface device 115 will be processing a single request (or transaction) at any one time. For instance, while the requestor 120 has sent the read request to the BIU 125 and is waiting for a grant of the request and the associated data to be placed in the read buffer 121, it is unable to generate any more requests on behalf of the peripheral 105. The requester 120 locally maintains the state information associated with a request until the BIU 125 grants the request and processing is completed by the requestor 120. In this example, only after the processing of the request is completed may the requestor 120 generate a new request In order for the requestor 120 to pipeline requests, i.e., process new requests on behalf of the peripheral 105 while waiting for a grant of a prior request from the BIU 125, the requestor 120 must have a mechanism for recalling state information associated with the prior request to be used by the requestor 120 to operate on the request when it is granted. Various types of pipeline-compatible request interface devices are described further below.

A request interface device 115 might be resident on a single integrated circuit containing the BIU 125 and the requestor 120, it might be contained on separate chips in a unitary circuit, or it might be distributed where the BIU 125 and the requestor 120 are distinct components that when operating together comprise a functional request interface device 115.

One Type of Pipeline-Compatible Request Interface Device

Figure 2:
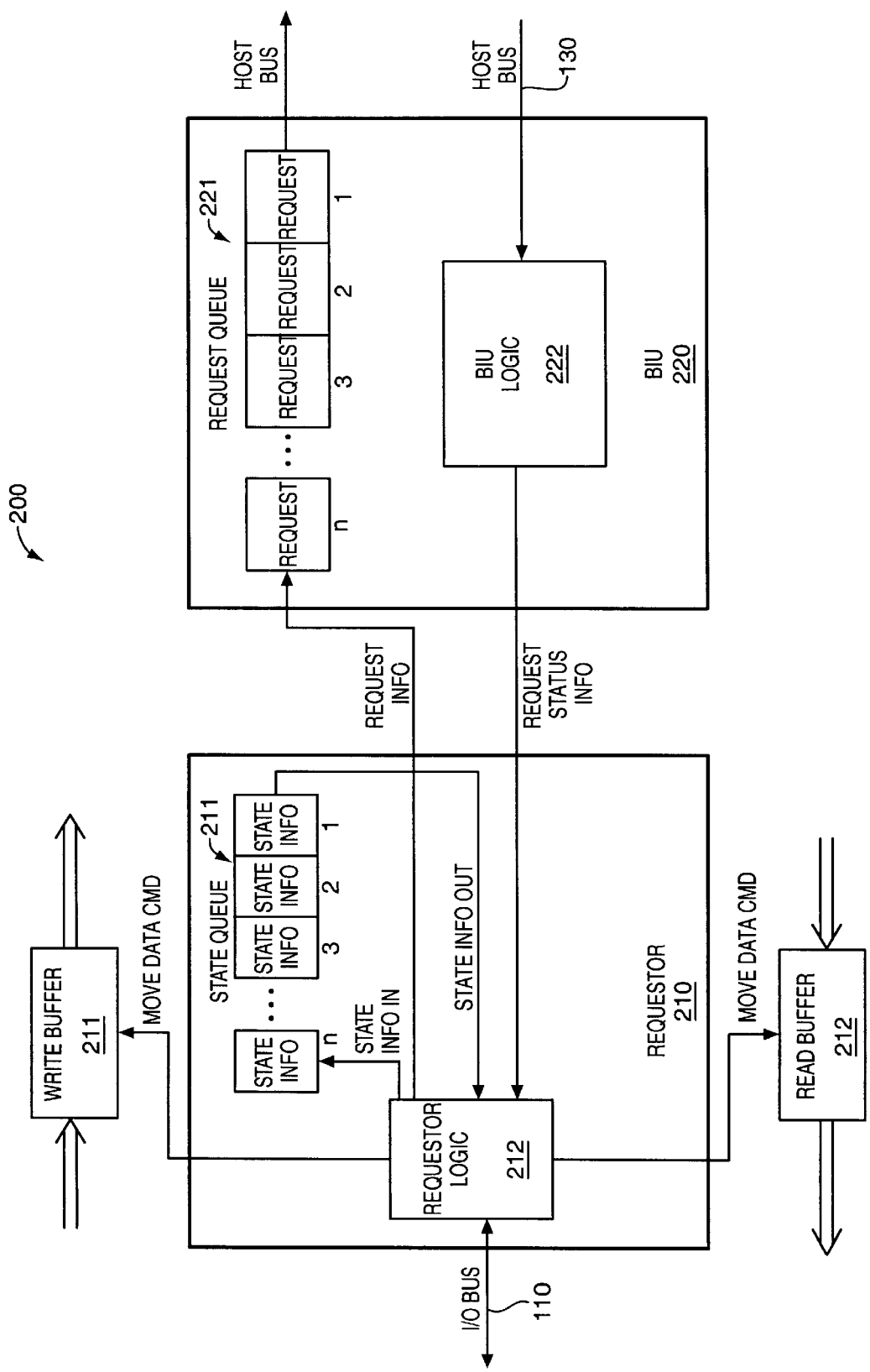
FIG. 2 is an illustration of request interface device that is pipeline capable.

FIG. 2 is an illustration of a one type of request interface device 200 that is pipeline capable. A request to transfer data or commands is generated by the requestor logic 212 of the requestor 210 on behalf of a peripheral attached to I/O bus 110. The requestor logic 212 also generates state information corresponding to the request. The state information determines the manner in which the requestor will operate on the request when the BIU 220 grants the request. Some of the information contained within the state information might include the direction of transfer of the request data, the length of the data, and where the data is to be sourced or sunk. The request information is then sent to the BIU 220 so that the BIU 220 may negotiate access to the host bus 130 relative to the request. The BIU 220 places the request information within a request information queue 221 that stores requests prior to being granted. Concurrently, the state information for the request is stored in a state information queue 211 within the requestor 210. The requestor 210 then is freed to generate new requests while it waits for the BIU 220 to process the request.

The BIU 220 processes requests stored in its request queue 221 based on the characteristics of the host bus 130. For example, the BIU 220 might combine several requests into a single packet transfer over the host bus 130 or it might break a request into several smaller transfer packets. In short, the BIU 220 determines the most efficient manner to transport the requests and the data and commands associated with the requests given the transport characteristics of the host bus 130. The BIU 220 grants the request and sends the request information to a destination, such as to memory 145, over the host bus 130.

Concurrently, the BIU logic 222 sends notice to the requestor 210 that the request has been granted. The requestor 210, upon receipt of notice that the a request has been granted, pulls the next available set of state information from the state information queue 211 to determine how to act upon the commands and data in the read or write buffers 213 & 214 related to the granted request.

A key consideration in the efficient operation of the request interface device 200 is the depth of the request information queue 221 and state information queue 211. The optimum depth of a queue is a function of the operation of the host bus 130. Some of the factors effecting the optimum depth of a queue for a particular host bus 130 include the latency between the time a request information is transferred over the bus and acknowledgement is received by the BIU 220 from the target of the request, the amount of traffic the host bus 130 is capable of handling, and transfer protocols of the host bus 130. If the depth of the request information queue 221 of the BIU 220 is properly matched to the host bus 130, but the state information queue 211 in the requestor 210 is not as deep as the request information queue 221, then the pipeline performance of request interface device 200 will be something less than that which could be supported by the host bus 130. In this scenario, once the state information queue 211 is full, the requestor 210 will not be able to generate anymore requests for the I/O bus peripherals 105 until it receives notice from the BIU 220 that the request associated with its oldest state information was granted, so that the requestor 210 may free a space in the state information queue 211 for a new request. It is of no consequence that the BIU's request information queue 221 is not being fully utilized, because the requestor 210 cannot send the BIU 220 anymore requests until unless space is freed in its state information queue 210 to store the state information associated with any newly generated request.

Accordingly, in this example, both the requestor 210 and the BIU 220 must be designed with queue depths relative to the performance characteristics of the host bus 130 to ensure maximum performance of the request interface device 200. This requirement makes sense when designing a BIU 220, because the BIU 220 is designed specifically to interface with a particular type of host bus 130. A requestor 210, however, is designed to service peripherals 105 off of the I/O bus 110, so its primary design requirements are dictated by I/O bus 110 and/or peripheral 105 characteristics. It follows that a requestor 210 in a request interface device 200 would have to be designed with regard to both a particular I/O bus 110 or peripheral 105, and a particular host bus 130 to achieve maximum possible efficiency with regard to transport speed and cost. It is possible to design a requestor 210 for a particular I/O bus 110 or peripheral 105 that is compatible with various host buses 130 by making the state information queue 211 as deep or deeper than the optimum minimum queue depth for any host bus 130 it may be used in conjunction with, but this would result an increased fabrication expense in additional queue memory that would not be used when the requestor 210 is mated with a BIU 220 with a more shallow request information queue 221. Furthermore, there is always the possibility that higher performance host buses 130 will be designed that require even greater queue depths which were not contemplated when the "generic" requestor 210 was designed, thereby making a redesign necessary.

Figure 3:
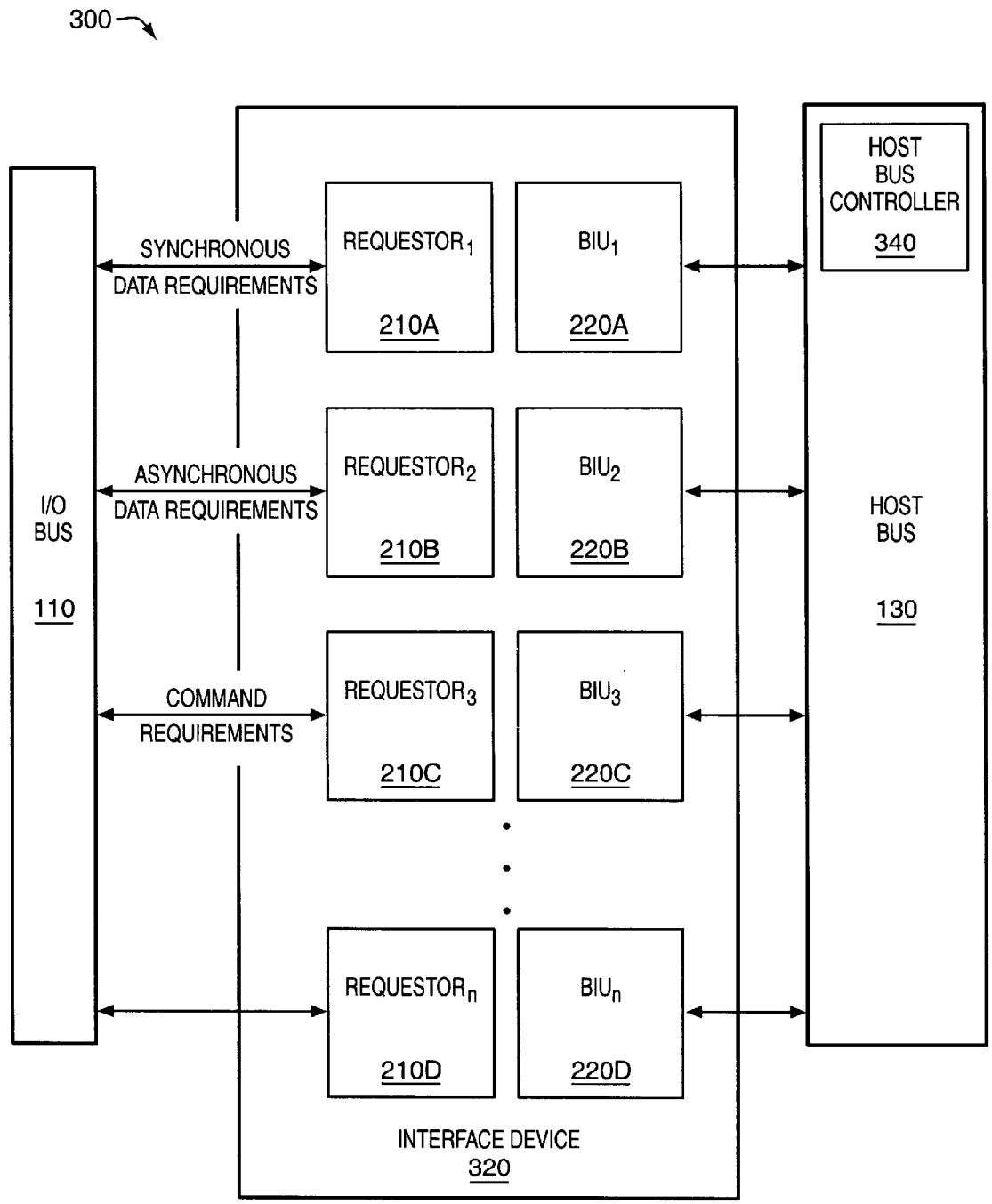
FIG. 3 is an illustration of a request interface comprising multiple requestors and BIU's.

A request interface device 300 may be comprised of more than one requestor 210 where the different requestors 210 may have different functions. An illustration of such an arrangement is shown in FIG. 3. Each requestor 210A–D handles a specific type of information requirement of peripherals 105 attached to the I/O bus 110. For example, requestor 210A processes and generates synchronous data requests and requestor 210B processes and generates asynchronous data requests. Requestor 210C is dedicated to handling command information requests. Because each requestor's state information queue 211 is synchronized with a BIU's request information queue 221, there must be a one to one correspondence between requesters 210A–D and BIU's 220A–D. Accordingly, BIU 220A serves only requestor 210A, BIU 220B serves only requestor 220B and so on. Each BIU 220 must negotiate with the host bus controller 340 for access to the host bus 130. When there are requests in more than one of the BIU's at any given moment, the host bus controller 340 must arbitrate between the BIU's 220A–D and determine which requests are to be given priority over the others concerning host bus 130 access.

There are several disadvantages and limitations of the pipeline compatible request interface device of the first type as illustrated in FIGS. 2 and 3. One, as discussed supra, the requestor 210 must be designed to have a state information queue 211 as least as deep as the optimum minimum queue depth for the host bus in order to insure maximum efficiency. Essentially, to design and produce the lowest cost requestor 210, the requestor 210 must be designed for the performance characteristics of both the I/O bus 110 and the host bus 130. Second, because of the one to one correspondence necessary between the state information queue 211 and request information queue 221, each requestor 210 must be coupled to a distinct BIU 220. As a result, a request interface device 300 with multiple requestors 210 will have multiple BIU's 220, presumably of the same design, that perform essentially the same task albeit for different requesters 210. Third, the host bus controller 340 will have to arbitrate the priority access time for BIU's 220 that are simultaneously requesting access to the host bus 130. The host bus may not have a mechanism for determining whether the synchronous requests from BIU 220A are more important than the asynchronous requests from BIU 220B.

Figure 4:
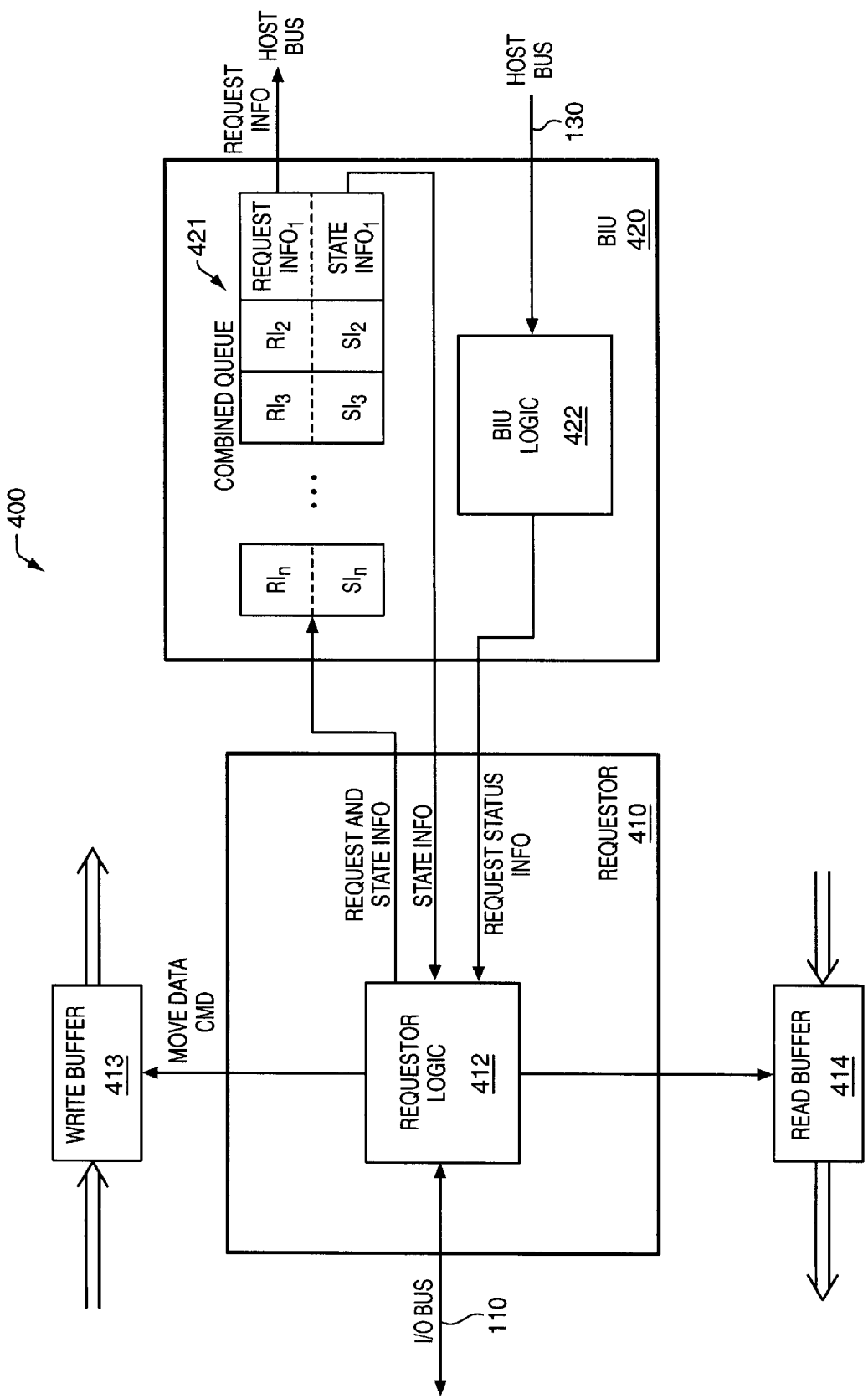
FIG. 4 illustrates a second type of request interface device wherein the state information queue and the request information queue are combined within the BIU according to another embodiment of the invention.

A Combined Queue Pipeline-compatible Request Interface Device Including A Pipeline Independent Requestor FIG. 4 is an illustration of a second type of pipeline-compatible request interface device according to one embodiment of the invention that overcomes the limitations of the first type request interface device discussed supra. A request to transfer data or commands is generated by requestor logic 412 of a requester 410. The requestor logic 412 also generates state information that determines the manner in which the requestor 410 will operate on the request when a BIU 420 grants it. Some of the information contained within the state information might include the direction of transfer of the request data, the length of the data, and where the data is to be sourced or sunk. The request information along with the state information is then sent to the BIU 420 so that the BIU 420 may negotiate access to the host bus 130 relative to the request. The BIU 420 places the request information and the state information within a combined queue 421 that stores requests prior to being granted with their associated state information. The requestor 410 then is freed to generate new requests while it waits for the BIU 420 to process the request.

The BIU 420 processes requests stored in its request queue based on the characteristics of the host bus. For example, the BIU 420 might combine several requests into a single packet transfer over the host bus or it might break a request into several smaller requests. In short, the BIU 420 determines the most efficient manner in which to transport the requests and the data and commands associated with the requests given the transport characteristics of the host bus 130. The BIU 420 grants the request and sends the request to a destination such as to memory over the host bus 130. Concurrently, the BIU 420 reflects state information associated with the request back to the requestor 410 along with notice that the request has been granted.

The requester 410, upon receipt of state information and the notice that the request has been granted, uses the state information to determine how to act upon the commands and data in the write and read buffers 413 & 414 associated with the granted request.

Advantageously, because the requestor 410 does not queue state information, it can be designed independent of the performance characteristics of the host bus 130. In essence, a "generic" requestor 410 for a particular type of I/O bus 110 and can be designed and fabricated that it may couple with any number of host busses 130 through a BIU 420 designed for the particular host bus 130. For example, a requestor 410 designed to interface with peripherals off of a IEEE 1394 I/O bus could be used in a request interface device 400 coupled to a either PCI host bus or a PCIX host bus.

A Multiple Requester, Single BIU Interface Device

Figure 5:
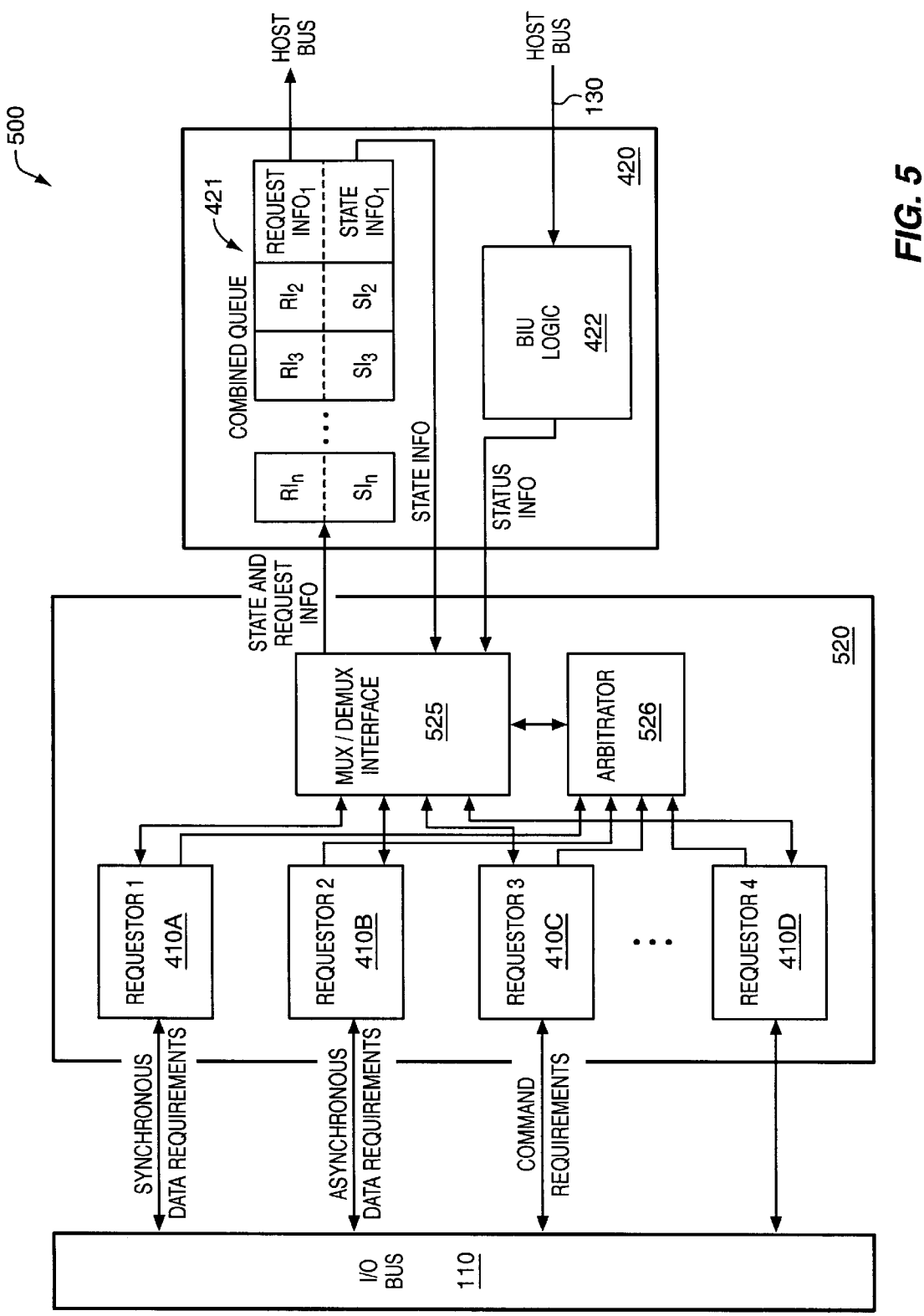
FIG. 5 is an illustration of a request interface device comprising multiple requesters according to another embodiment of the invention.

FIG. 5 illustrates another embodiment of the invention where the use of a combined queue facilitates using a single BIU with a number of requesters.

Each requester 410A–D handles a specific type of information requirement of peripherals 105 attached to an I/O bus 110, or each requestor might be assigned to a specific peripheral 105. For example, requestor 410A processes and generates synchronous data requests and requestor 410B processes and generates asynchronous data requests. Requestor 410C is dedicated to handling command information requests. It is also possible using this design that multiple I/O buses 110 could interface with a single request interface device 500, wherein each I/O bus 110 is serviced by one or more requestors 410 dedicated to servicing the needs of peripherals 105 attached to that I/O bus 110.

The requestors 410 generate requests based on the needs of associated peripherals 105 attached to the I/O bus 110. The requestors 410 assigns state information to the request that indicates which requestor 410 was the source of the request. The requesters 410 may also generate additional state information regarding the nature of the request that will determine the manner in which the requestor 410 will operate on the request when the BIU 420 grants it. The requestor 410 sends the request to a mux/demux device 525. An arbitrator 526 that has knowledge of the types of requests or transactions being generated may be used to sort the requests being received by the mux/demux device 525 based on transfer priority. For example, if an asynchronous request is received by the mux/demux device 525 from requestor 410B at the same time (or in close proximity) to a synchronous request from requester 410A, the arbitrator 526 may assign a higher priority value to the synchronous request facilitating its transfer to the BIU 420 ahead of the asynchronous request. The mux/demux device 525 sends the requests along with the associated state information to the BIU 420 based on priority as applicable so that the BIU 420 may negotiate access to the host bus 130 relative to the requests. The BIU 420 places the request information and the state information within a combined queue 421 that stores requests prior to being granted with their associated state information. The requestors 410 are then freed to generate new requests while they wait for the BIU 420 to process the requests.

In an alternative embodiment it is contemplated that the state information indicating which requestor was the source of a particular request is assigned by the mux/demux device 525 instead of the requestors themselves. Furthermore, it is also contemplated that when the state information indicating which requestor 410 created the request is assigned by the creating requestor 410, then the request need not be transferred through the mux/demux device 525 but directly to the BIU 420.

The BIU 420 processes requests stored in its combined queue 421 based on the characteristics of the host bus 130. For example, the BIU 420 might combine several requests into a single packet transfer over the host bus or it might break a request into several smaller requests. In short, the BIU 420 determines the most efficient manner in which to transport the requests and the data and commands associated with the requests given the transport characteristics of the host bus 130. When the BIU 420 grants a request and sends the request to a destination such as to memory 145 over the host bus 130, it, concurrently, reflects the state information associated with the request back to the mux/demux device 525 along with notice that the request has been granted.

The mux/demux device 525, upon receipt of state information and the notice that the request was been granted, routes the notice that the request was granted back to the requester 410 that generated the request along with remaining state information, as applicable, at the direction of a portion of the state information that indicates which requester 410 was the source of the granted request.

When the requestor 410 receives the remaining state information and the notice that its request was granted, it uses the state information to determine how to act upon the commands and data in the write and read buffers 413 & 414 associated with the granted request.

It is contemplated that state information may relate only to which requestor was the source of a request. In which case, only the notice that the request was granted and no state information would be returned to the requestor 410. Accordingly, the requester 410 would retain its state until the request was granted.

Advantageously, in contrast to the multiple request interface device of FIG. 3, only a single BIU is required to service multiple requesters. This facilitates more the fabrication of more cost efficient request interface devices.

What is claimed is:

1. A device to be coupled between a first bus and a second bus comprising:

a plurality of data transfer requestors to be coupled with the first bus to receive requests from peripherals coupled with the first bus to exchange data with a target component coupled with the second bus, each of the requestors comprising request logic to generate a data transfer request and corresponding state information based on a request received from a peripheral;

a mux/demux device coupled with the plurality of data transfer requesters to receive data transfer requests and corresponding state information from the requesters; and a bus interface unit coupled with the mux/demux device to receive the data transfer requests and corresponding state information, the bus interface unit to be coupled with the second bus and the target component, wherein the bus interface unit comprises a memory to store the requests and state information received from the mux/demux device, and wherein the bus interface unit comprises bus interface unit logic to retrieve a first data transfer request and its corresponding state information from the memory, gain access to the second bus, transmit the first data transfer request over the second bus, and contemporaneously provide the state information corresponding to the first data transfer request to the mux/demux device.

2. The device of claim 1:

further comprising an arbitrator coupled with the mux/demux device to determine an order for the data transfer requests; and wherein the bus interface unit comprises a bus interface unit to receive the data transfer requests and corresponding state information in the order specified by the arbitrator.

3. The device of claim 1, wherein each of the plurality of data transfer requestors are assigned to a particular peripheral of the peripherals.

4. The device of claim 1, wherein the request logic of each of the requestors comprise logic to generate new data transfer requests while awaiting state information corresponding to an earlier provided data transfer request from the bus interface unit.

5. The device of claim 1, wherein the mux/demux device comprises a mux/demux device to provide state information indicating which requestor is associated with a received data transfer request.

6. The device of claim 1:

wherein the first bus comprises an input/output bus; and wherein the second bus comprises a host bus.

7. The device of claim 6:

wherein the input/output bus comprises a bus selected from the group consisting of an ISA bus, a SCSI bus, an IEEE 1394 bus, and a USB; and wherein the host bus comprises a PCI bus.

8. The device of claim 1, wherein the memory comprises a queue having a depth that is matched to a pipeline characteristic of the second bus.

9. The device of claim 8, wherein the requestors have designs that are independent of the pipeline characteristic of the second bus.

10. The device of claim 1, further comprising a plurality of data transfer requests and their corresponding state information stored in the memory.

11. The device of claim 1, wherein the plurality of requestors includes a first requestor to process and generate synchronous requests and a second requestor to process and generate asynchronous requests.

12. The device of claim 1, wherein the plurality of requestors comprise a DMA engine.

13. A computer system comprising:

an input/output bus;

a peripheral device coupled with the input/output bus to provide a first data transfer request to the input/output bus;

a host bus;

a target component coupled with the host bus containing a data associated with the data transfer request; and a request interface device coupled between the input/output bus and the host bus to facilitate the transfer of the data from the target component to the peripheral device, the device comprising:

a plurality of data transfer requesters coupled with the input/output bus, the plurality of data transfer requestors including a first data transfer requestor to receive the first data transfer request from the peripheral device, the first data transfer requestor containing request logic to generate a second data transfer request and corresponding state information based on the received first data transfer request;

a mux/demux device coupled with the plurality of data transfer requestors to receive data transfer requests and corresponding state information from the requesters, including to receive the second data transfer request and corresponding state information from the first data transfer requestor; and a bus interface unit coupled with the mux/demux device to receive the second data transfer request and corresponding state information, the bus interface unit coupled with the host bus and the target component, wherein the bus interface unit comprises a memory to store the second data transfer request and corresponding state information received from the mux/demux device, and wherein the bus interface unit comprises bus interface unit logic to retrieve the second data transfer request and corresponding state information from the memory, gain access to the host bus, transmit the second data transfer request over the host bus, and contemporaneously provide the state information corresponding to the second data transfer request to the mux/demux device.

14. The computer system of claim 13:

further comprising an arbitrator coupled with the mux/demux device to determine an order for the data transfer requests; and wherein the bus interface unit comprises a bus interface unit to receive the data transfer requests and corresponding state information in the order specified by the arbitrator.

15. The computer system of claim 13:

wherein the input/output bus comprises a bus selected from the group consisting of an ISA bus, a SCSI bus, an IEEE 1394 bus, and a USB; and wherein the host bus comprises a PCI bus.

16. The computer system of claim 13, wherein the plurality of requesters includes a first requestor to process and generate synchronous requests and a second requestor to process and generate asynchronous requests.

17. A device comprising:

a plurality of requesters, each of the requesters including, a requestor interface, and requestor logic to generate transfer requests and associated state information, transmit the transfer requests and the associated state information to a bus interface unit through the requestor interface and a mux/demux device, and receive an indication that a transfer request has been granted from the bus interface unit through the requestor interface and the mux/demux device;

a first requestor of the plurality of requestors to generate a first transfer request and state information associated with the first transfer request and send the first transfer request and the state information associated with the first transfer request to the bus interface unit through the first requestor interface and the mux/demux device;

the mux/demux device to, transfer the first transfer request and the state information associated with the first transfer request from the first requester to the bus interface unit, receive the state information associated with the first transfer request from the bus interface unit along with an indication that the first transfer request has been granted, route the received state information associated with the first transfer request and the indication that the first transfer request has been granted to the first requestor; and the bus interface unit including, a first bus interface unit interface coupled with the mux/demux device to receive the first transfer request and the state information associated with the first transfer request, a second bus interface unit interface coupled with a host bus, a memory to store the first transfer request and the state information associated with the first transfer request, and a bus interface unit logic to retrieve the first transfer request and the state information associated with the first transfer request from the memory, gain access to the host bus, transmit the first transfer request over the host bus through the second bus interface unit interface, and contemporaneously reflect the state information associated with the first transfer request back to the mux/demux device through the first bus interface unit interface.

18. The device of claim 17, further comprising an arbitrator coupled with the mux/demux device to determine the order in which transfer requests received from the plurality of requesters will be sent to the bus interface unit by the mux/demux device based on the priority of each transfer request.

19. The device of claim 17, wherein the memory comprises a queue having a depth that is matched to a pipeline characteristic of the host bus.

20. The device of claim 17, wherein at least a portion of the state information associated with the first request received by the mux/demux device from the bus interface unit after the first transfer request is granted is sent by the mux/demux device to the first requester, and is utilized by the requestor logic to direct the transfer of information associated with the first transfer request.

* * * * *